(12) United States Patent
Kuhl et al.

(10) Patent No.: US 12,179,724 B2
(45) Date of Patent: Dec. 31, 2024

(54) UNI-DIRECTIONAL REDUNDANT SOLENOID VALVE FOR BRAKE ACTUATOR AND SYSTEM THEREOF

(71) Applicant: DEERE & COMPANY, Moline, IL (US)

(72) Inventors: Marcus L. Kuhl, Cedar Falls, IA (US); David Griffin Reid, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 974 days.

(21) Appl. No.: 17/110,819

(22) Filed: Dec. 3, 2020

(65) Prior Publication Data
US 2021/0284119 A1    Sep. 16, 2021

Related U.S. Application Data

(60) Provisional application No. 62/987,628, filed on Mar. 10, 2020.

(51) Int. Cl.
*B60T 13/68*    (2006.01)
*B60T 15/02*    (2006.01)
(Continued)

(52) U.S. Cl.
CPC .......... *B60T 15/028* (2013.01); *B60T 13/686* (2013.01); *F16K 31/0613* (2013.01);
(Continued)

(58) Field of Classification Search
CPC .... B60T 15/028; B60T 13/686; B60T 17/221; B60T 2270/88; F16K 31/0613; F16K 31/0679
See application file for complete search history.

(56) References Cited

U.S. PATENT DOCUMENTS 3,742,971 A * 7/1973 Worthington ........... F15B 11/15
137/624.18
4,191,061 A * 3/1980 Miller ................ F02M 63/0205
74/108

(Continued)

FOREIGN PATENT DOCUMENTS

EP    0678694 A1    10/1995

OTHER PUBLICATIONS

German Search Report issued in application No. DE102021201157. 8, dated Oct. 11, 2021, 06 pages.

*Primary Examiner* — Thomas W Irvin
(74) *Attorney, Agent, or Firm* — Taft Stettinius & Hollister LLP; Stephen F. Rost (57) ABSTRACT

An electrohydraulic valve system for controlling a braking system of a work machine includes a valve body forming a bore and a fluid channel, and a valve spool disposed within the bore and in fluid communication with the fluid channel. The valve spool includes at least a first land and a second land. An armature is positioned with respect to the valve spool to move the valve spool axially within the bore between a first position and a second position. A spring is disposed within the bore and biases the valve spool to its first position. A first electromagnetic coil and a second electromagnetic coil are operably controlled between an energized state and a de-energized state. The spring biases the valve spool to its first position when at least one of the first and second electromagnetic coil is in its de-energized state.

18 Claims, 3 Drawing Sheets

(51) Int. Cl.
*F16K 31/06* (2006.01)
*B60T 17/22* (2006.01)

(52) U.S. Cl.
CPC ......... *F16K 31/0679* (2013.01); *B60T 17/221* (2013.01); *B60T 2270/88* (2013.01)

(56) References Cited

U.S. PATENT DOCUMENTS

| | | | | |
|---|---|---|---|---|
| 4,295,111 | A * | 10/1981 | Frosch | H01F 7/1615 335/266 |
| 4,512,549 | A * | 4/1985 | Gast | F16K 31/082 251/129.1 |
| 5,018,797 | A * | 5/1991 | Takata | B60T 8/364 303/119.2 |
| 5,067,687 | A * | 11/1991 | Patel | B60T 8/3665 251/129.08 |
| 5,108,070 | A * | 4/1992 | Tominaga | H01F 7/1615 251/129.1 |
| 5,249,603 | A * | 10/1993 | Byers, Jr. | F16K 31/0613 251/129.1 |
| 5,359,309 | A * | 10/1994 | Juds | H01F 7/08 335/266 |
| 5,787,915 | A * | 8/1998 | Byers | F16K 31/0613 318/653 |
| 6,206,038 | B1 * | 3/2001 | Klein | B60T 15/028 303/119.2 |
| 6,428,117 | B1 * | 8/2002 | Messersmith | B60T 13/22 188/170 |
| 6,460,557 | B1 * | 10/2002 | Levitan | F15B 13/0402 251/129.1 |
| 7,325,564 | B2 * | 2/2008 | Ryuen | F16K 31/0613 335/297 |
| 10,006,541 | B2 * | 6/2018 | Burkhart | F16K 31/0613 |
| 10,400,909 | B2 * | 9/2019 | Mott | F01L 13/00 |
| 11,543,045 | B2 * | 1/2023 | Kuhl | F15B 13/0402 |
| 2004/0129322 | A1 * | 7/2004 | Chen | G05D 16/2024 137/625.65 |
| 2016/0076642 | A1 * | 3/2016 | Burkhart | F16H 61/0276 137/625.65 |
| 2019/0120401 | A1 * | 4/2019 | Mott | F01L 13/00 |
| 2019/0178406 | A1 * | 6/2019 | Ishihara | F16H 61/02 |
| 2019/0203846 | A1 * | 7/2019 | Ishihara | F16K 31/0613 |
| 2020/0096017 | A1 * | 3/2020 | Becker | F16H 63/3433 |
| 2020/0141426 | A1 * | 5/2020 | Diaz | F16K 11/0704 |
| 2021/0284118 | A1 * | 9/2021 | Kuhl | B60T 13/686 |
| 2021/0285563 | A1 * | 9/2021 | Kuhl | E02F 9/2083 |
| 2021/0317927 | A1 * | 10/2021 | Lindahl | F16K 31/082 |

* cited by examiner

UNI-DIRECTIONAL REDUNDANT SOLENOID VALVE FOR BRAKE ACTUATOR AND SYSTEM THEREOF

RELATED APPLICATIONS

This application claims the benefit of U.S. Provisional Patent Application Ser. No. 62/987,628, filed Mar. 10, 2020 and entitled "Unidirectional Redundant Solenoid Valve for Brake Actuator and System Thereof," the disclosure of which is hereby incorporated by reference in its entirety.

FIELD OF THE DISCLOSURE

The present disclosure relates to a work machine, and in particular, to an electrohydraulic valve system for controlling a braking system of the work machine.

BACKGROUND

Work machines, such as an agricultural tractor or those in the agricultural industry, include a braking system for slowing or stopping the machine during operation or holding the machine stationary (e.g., a park or service brake). The braking system may include a park device control for controlling a park or service brake, for example. In these systems, a hydraulic valve can be electrically controlled to actuate between two or more positions to control a flow of hydraulic fluid to a brake actuator. ISO 25119 is an international standard that governs regulatory requirements of agricultural equipment, including ensuring control systems of the equipment or work machine functions correctly. Moreover, this standard sets out general principles for the design and development of safety-related parts of control systems on tractors, self-propelled ride-on machines, and other work machines in the agricultural and forestry industries. Thus, to meet the regulatory requirements of work machines, it is desirable to control the valve to prevent or reduce any errant actuation thereof during operation.

SUMMARY

In one embodiment of the present disclosure, an electrohydraulic valve system for controlling a braking system of a work machine includes a valve body forming a bore and a fluid channel; a valve spool disposed within the bore and in fluid communication with the fluid channel, the valve spool including at least a first land and a second land; an armature positioned with respect to the valve spool to move the valve spool axially within the bore between a first position and a second position; a spring disposed within the bore and biasing the valve spool to its first position; a first electromagnetic coil being operably controlled between an energized state and a de-energized state; and a second electromagnetic coil being operably controlled between an energized state and a de-energized independently of the first electromagnetic coil; wherein, the first and second electromagnetic coils are arranged relative to the armature for forming a magnetic field when energized; wherein, the spring biases the valve spool to its first position when at least one of the first and second electromagnetic coil is in its de-energized state.

In a first example of this embodiment, the first and second electromagnetic coils are arranged concurrently with respect to one another. In a second example, the first and second electromagnetic coils are arranged in parallel or series with respect to one another. In a third example, a first net force exerted on the valve spool by the spring is opposed by a second net force exerted on the valve spool when the first and second electromagnetic coils are energized. In a fourth example, when the first and second electromagnetic coils are de-energized, the first net force is greater than the second net force to bias the valve spool to its first position; and when the first and second electromagnetic coils are energized, the second net force is greater than the first net force to bias the valve spool in its second position.

In a fifth example, when the valve spool is in its first position and either the first or second electromagnetic coil is energized, the first net force is greater than the second net force. In a sixth example, when the valve spool is in its second position and either the first or second electromagnetic coil is de-energized, the first net force is greater than the second net force. In a seventh example, in the first position, the valve spool blocks fluid communication between the flow channel and a pressure source; and in the second position, the valve spool allows fluid communication between the flow channel and a pressure source.

In another embodiment of the present disclosure, an electrohydraulic control system for controlling a braking system of a work machine includes a controller; a source of hydraulic fluid; a brake actuator configured for moving between an engaged and disengaged position; a valve body forming a bore and a port, the port being fluidly coupled to the bore and the brake actuator; a valve spool disposed within the bore and in fluid communication with the port; an armature positioned with respect to the valve spool to move the valve spool axially within the bore between a first position and a second position; a spring disposed within the bore and biasing the valve spool to its first position; and a first electromagnetic coil and a second electromagnetic coil arranged relative to one another and the armature for forming a magnetic field when energized; wherein, the first electromagnetic coil is in electrical communication with the controller via a first communication link, and the second electromagnetic coil is in electrical communication with the controller via a second communication link; further wherein, the first communication link and the second communication link are independent from one another.

In a first example of this embodiment, the spring biases the valve spool to its first position when at least one of the first and second electromagnetic coil is in its de-energized state. In a second example, the first and second electromagnetic coils are arranged concurrently with respect to one another. In a third example, the first and second electromagnetic coils are arranged in parallel or series with respect to one another.

In a fourth example, a first net force exerted on the valve spool by the spring is opposed by a second net force exerted on the valve spool when the first and second electromagnetic coils are energized. In a fifth example, when the first and second electromagnetic coils are de-energized, the first net force is greater than the second net force to bias the valve spool to its first position; and when the first and second electromagnetic coils are energized, the second net force is greater than the first net force to bias the valve spool to its second position. In a sixth example, when the valve spool is in its first position and either the first or second electromagnetic coil is energized, the first net force is greater than the second net force.

In a seventh example, when the valve spool is in its second position and either the first or second electromagnetic coil is de-energized, the first net force is greater than the second net force. In an eighth example, in the first position, the valve spool blocks fluid communication between the source and the port; and in the second position, the valve spool allows fluid communication between the source and the port.

In a further embodiment, a work machine includes a controller; a braking system comprising a brake actuator for engaging or disengaging a brake; a source of hydraulic pressure; and an electrohydraulic valve system comprising a valve body forming a bore and a port, the port being fluidly coupled to the bore and the brake actuator; a valve spool disposed within the bore and in fluid communication with the port; an armature positioned with respect to the valve spool to move the valve spool axially within the bore between a first position and a second position; a spring disposed within the bore and biasing the valve spool to its first position; and a first electromagnetic coil and a second electromagnetic coil arranged relative to one another and the armature for forming a magnetic field when energized; wherein, the first electromagnetic coil is in electrical communication with the controller via a first communication link, and the second electromagnetic coil is in electrical communication with the controller via a second communication link; wherein, the first communication link and the second communication link are independent from one another; further wherein, the spring biases the valve spool to its first position when at least one of the first and second electromagnetic coil is in its de-energized state.

In a first example of this embodiment, in the first position, the valve spool blocks fluid communication between the source and the port; and in the second position, the valve spool allows fluid communication between the source and the port. In a second example, a first net force exerted on the valve spool by the spring is opposed by a second net force exerted on the valve spool by the first and second electromagnetic coils; wherein when the first and second electromagnetic coils are de-energized, the first net force is greater than the second net force to bias the valve spool to its first position; when the first and second electromagnetic coils are energized, the second net force is greater than the first net force to bias the valve spool to its second position; when the valve spool is in its first position and either the first or second electromagnetic coil is energized, the first net force is greater than the second net force; and when the valve spool is in its second position and either the first or second electromagnetic coil is de-energized, the first net force is greater than the second net force.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

Figure 1:
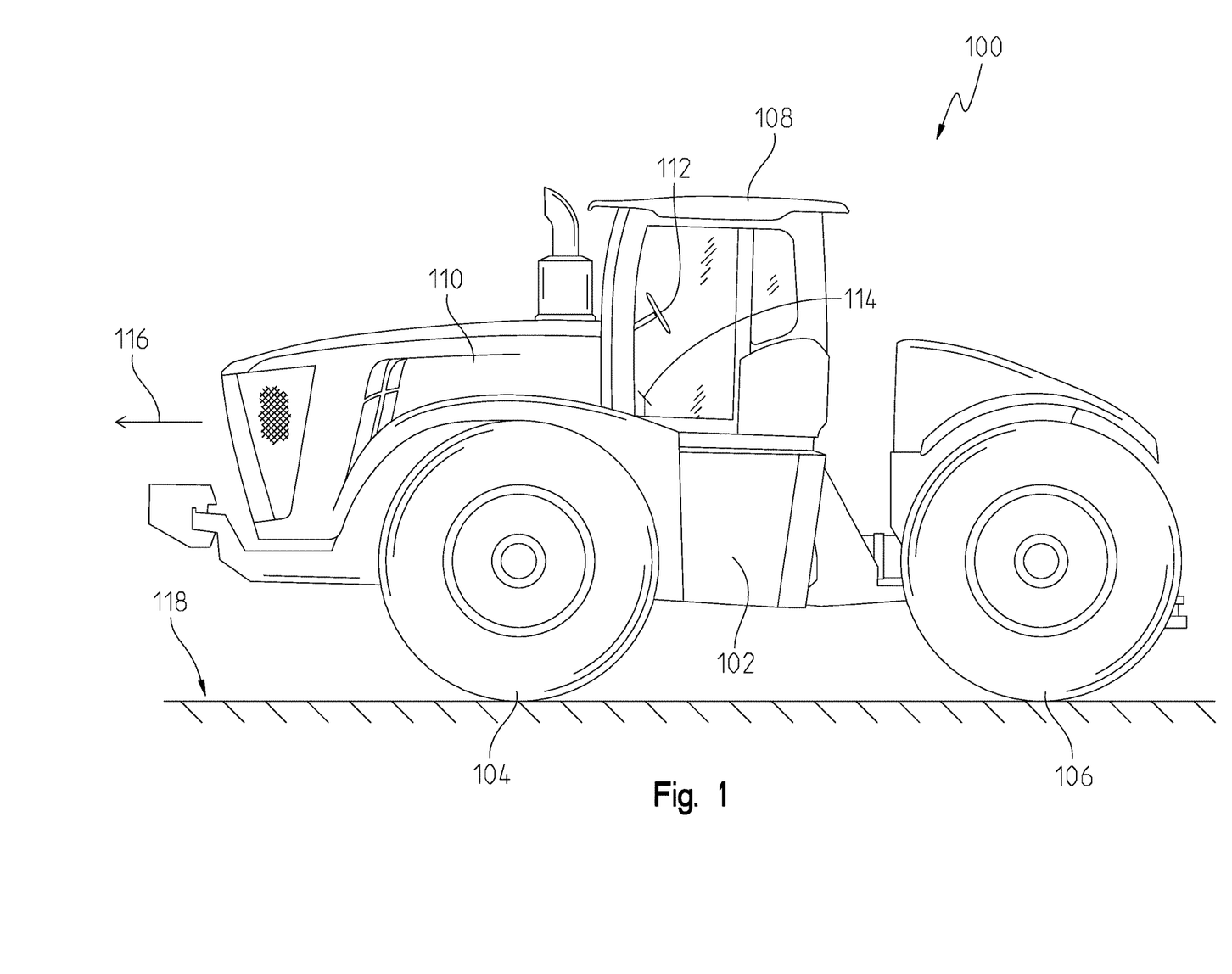
FIG. 1 is a side view of a work machine.

An exemplary embodiment of a work machine is shown in FIG. 1. The machine is embodied as a tractor 100, but the present disclosure is not limited to a tractor and may extend to other work machines in the agricultural, construction, and forestry industries. As such, while the figures and forthcoming description may relate to a tractor, it is to be understood that the scope of the present disclosure extends beyond a tractor and, where applicable, the term "machine" or "work machine" will be used instead. The term "machine" or "work machine" is intended to be broader and encompass other vehicles besides a tractor for purposes of this disclosure.

Referring to FIG. 1, the machine 100 includes a chassis 102 or frame. The chassis 102 can be supported on the ground 118 by a plurality of ground-engaging mechanisms. In FIG. 1, the plurality of ground-engaging mechanisms includes one or more front wheels 104 and one or more rear wheels 106. In an alternative embodiment, the plurality of ground-engaging mechanisms may include tracks for moving the machine 100 along the ground 118.

The chassis 102 includes a cab 108 in which the machine operator controls the machine. The cab 108 can include a control system including, but not limited to, a steering wheel 112, a control level, a joystick, control pedals, or control buttons. The operator can actuate one or more controls of the control system for purposes of operating the machine 100. In this illustrated embodiment, a control lever 114 is shown in the cab 108 for actuating a braking system (not shown) of the machine 100. Alternatively, the control lever 114 may comprise a pedal, button, or knob. When actuated or engaged, the braking system may slow or reduce a speed of the machine. When released, the braking system is not active and the machine is able to traverse in a forward travel direction 116 or in an opposite, reverse direction.

The work machine 100 may include an engine compartment 110 for housing an engine or other power-generating device. Although not shown, a transmission, cooling system, and the like may also be located in or near the engine compartment 110.

Figure 2:
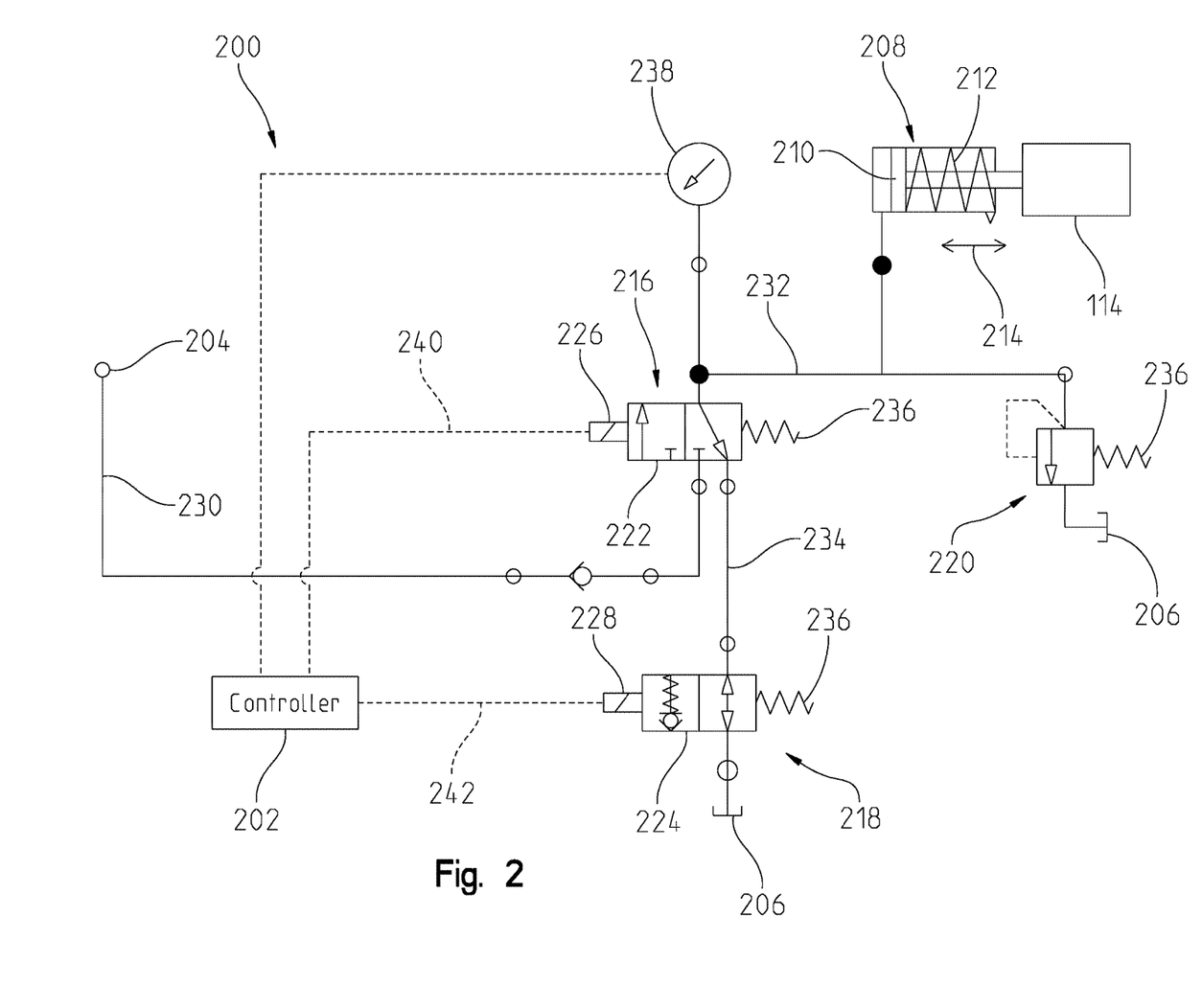
FIG. 2 is a schematic of a control system for controlling actuation of a brake actuator of the work machine of FIG. 1.

Referring now to FIG. 2, a control system 200 is shown for engaging or releasing the braking system of the work machine. In this embodiment, a controller 202 may be provided for electrically controlling the work machine 100. The controller 202 may be a machine controller for controlling the operation of the work machine, or it may be part of a larger control system that includes two or more controllers. The controller 202 may be an engine controller, a transmission controller, a brake controller, or any other type of controller.

In the embodiment, the control system 200 is designed as an electrohydraulic control system for controller the braking system. Here, a pressure source 204 may include a tank or reservoir of hydraulic fluid. The pressure source 204 may be fluidly coupled to a sump or reservoir 206 where fluid may be leaked or dumped during machine operation.

The braking system may include a brake actuator 208 for engaging or disengaging a brake or a pawl (i.e., a park brake). The brake actuator 208 may include a piston 210 and return spring 212. The piston 210 may be biased by the spring in a first direction and fluidly applied such that it moves in an opposite, second direction. As such, the piston 212 can move in an actuation direction 214 based on a difference between the amount of fluid pressure being applied to one side of the piston 212 and the spring force applied by the return spring 212 to an opposite side thereof.

The control system 200 may also include a plurality of valves. For instance, a supply electrohydraulic solenoid valve assembly 216 ("supply valve"), a sump block electrohydraulic solenoid valve assembly 218 ("sump block valve"), and a relief valve 220 may be located in the system 200. The supply valve 216 may include a spool valve 222 which may be actuated when a solenoid 226 is energized and forces the spool valve 222 to compress a spring 236. When the solenoid 226 is de-energized, the spring 236 can decompress and move the spool valve 222 in an opposite direction.

The sump block valve 218 may include a spool valve 224 which may also be actuated when another solenoid 228 is energized and forces the spool valve 224 to compress a spring 236. When the solenoid 228 is de-energized, the spring 236 can decompress and move the spool valve 224 in an opposite direction. As shown, the relief valve 220 may be actuated when extra fluid in the system flows and forces the valve 220 to compress a spring 236. When the pressure is reduced, the spring 236 may return the valve 220 to its unapplied state.

The control system 200 is arranged such that fluid from the pressure source 204 may flow through a main circuit line 230, and depending upon the state or position of the supply valve 224, fluid may be blocked or allowed to flow to the actuator 208. In this embodiment, the brake actuator 208 may be applied when there is no or little fluid flowing to the actuator 208. In this manner, the brake actuator is applied by the spring 212. To disengage the brake actuator 208, the supply valve 216 may be actuated to thereby open fluid flow from the main circuit line 230 to a second line 232 that feeds directly to the brake actuator 208. A third line 234 fluidly couples the supply valve 216 and the sump block valve 218. As hydraulic fluid builds in the second line 232, the amount of force applied to the brake actuator 208 may exceed the spring force thereby causing the brake actuator to disengage or release.

The controller 202 may be in electrical communication with a pressure sensor 238, as shown. The pressure sensor 238 may detect the amount of fluid pressure in the second line 238 and communicate the same to the controller 202. In this way, the controller 202 may be able to determine whether the brake actuator 208 is engaged or disengaged based on the amount of fluid pressure detected by the pressure sensor 238.

The controller 202 is also able to control actuation of the supply valve 216 and sump block valve 218. In particular, the controller 202 may be in electrical communication with the solenoids 226, 228 to energize or de-energize each, thereby controlling the movement of each valve. In this manner, the controller 202 may include control logic stored within a memory unit or the like which is executed by a processor to control the electrical state of each solenoid. The controller 202 may be in communication, for example, with the control lever 114 when an operator sends a command to either engage or disengage the braking system. Upon receiving this command from the control lever 114, the controller 202 may control the solenoids 226, 228 to reach the desired state commanded by the operator.

Braking systems, particularly park brake circuits with electrohydraulically actuated park brakes and park pawls, are often used in tractors and other agricultural machines. The parking brake system of a work machine is designed to provide a level of safety with built in redundancy to ensure that if there is an error in the system or control logic, the parking brake does not engage or disengage in unsafe or undesirable circumstances. As described above, ISO 25119 is a regulatory requirement that evaluates electronic control of braking systems such that if an error does arise in the control logic, the braking system does not act in an undesirable way.

In the braking system 200 of FIG. 2, hydraulic fluid is directed from the source 204 to the hydraulic actuator 208 in order to disengage the brake. As described above, this is done by actuating the supply valve 216 and the sump block valve 218 to open a flow path between the source 204 and the actuator 208. The sump block valve 218 generally is designed to have low leakage. Thus, if there is a loss of fluid or leakage of fluid past the supply valve 216, fluid pressure on the actuator 208 may slowly decrease but the actuator will remain disengaged so long as the sump block valve 218 remains actuated.

An issue, however, can arise if the control logic or current sent to the solenoid 226 of the sump block valve 216 or the solenoid 228 of the sump block valve 218 is erroneously lost or discontinued when the brake actuator 208 is disengaged, the park brake may be accidentally engaged due to a leakage of oil or a direct flow path opening up between the source and brake actuator 208. It can further be undesirable for either valve to be actuated on when the brake actuator is engaged, as hydraulic fluid may flow to the hydraulic actuator 208 and apply it. In each situation, the brake actuator 208 may be undesirably engaged or disengaged against the intention of the operator.

In the present disclosure, one or more embodiments are disclosed which may provide necessary redundancy to braking systems such as the one shown in FIG. 2. In particular, each embodiment may include two or more electromagnetic coils disposed in electrical communication with a controller such that the controller communicates independently with each coil to actuate a valve. In this system, each coil is either energized or de-energized by the controller before a valve changes state. Thus, if there is an error in the control logic and both coils are not energized or de-energized, then the valve does not change state.

The coils may be arranged in a plurality of ways. For example, the coils may be arranged in series, parallel or concentrically with respect to an armature. In parallel, each coil may act on its own armature to induce movement of the valve.

When electrically actuated, each coil creates a magnetic field which results in a force being exerted on the armature. The armature may be mechanically coupled to a valve spool, which moves in a longitudinal direction within a valve casting or housing to divert hydraulic fluid between ports. In the forthcoming embodiments, the force exerted by a single coil may not be great enough to overcome other, opposing forces being exerted on the armature and spool valve. However, when both coils are energized (or de-energized as the case may be), there is enough net force acting on the valve to change its state. As such, this built in redundancy to these embodiments is better able to protect the braking system and work machine from errors in control logic that can otherwise result in undesirable engagement or disengagement of the braking system.

Figure 3:
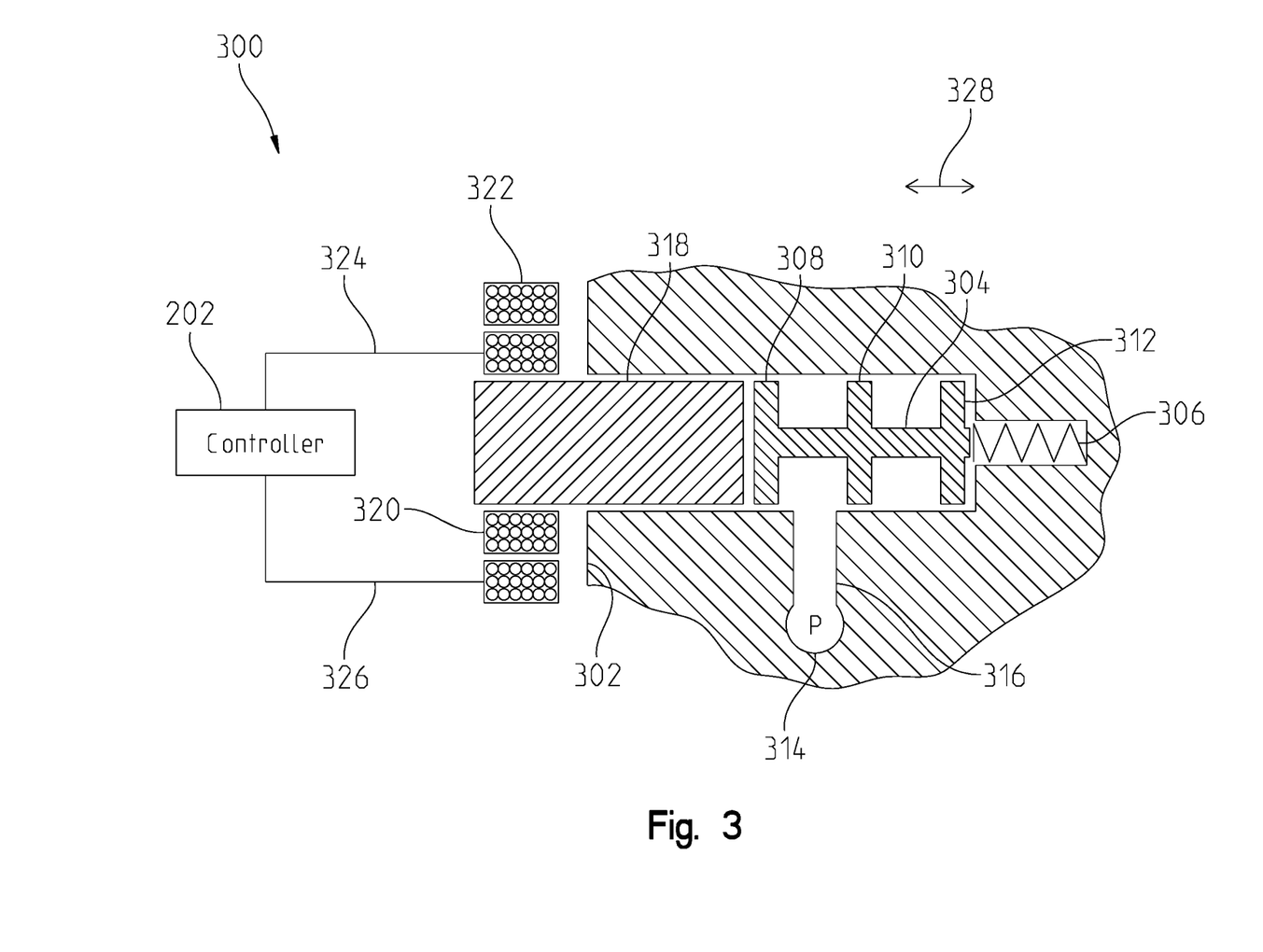
FIG. 3 is a schematic of an embodiment of an electrohydraulic valve for controlling actuation of a braking system on a work machine.

Referring to FIG. 3, an embodiment of an electrohydraulic valve system 300 for a braking system of a work machine is illustrated. The valve system 300 may be either or both the supply valve 216 or sump block valve 218 in the system 200 of FIG. 2. As shown, the valve system 300 may include a valve body 302, cast body or housing. A spool valve 304 is located within a bore of the valve body 302 and may be actuated in a longitudinal direction 328 in order to divert hydraulic fluid into a flow passage 316 fluidly coupled to a brake actuator port 314. The brake actuator port 314 may be in fluid communication with the brake actuator 208 of FIG. 2, and as such the flow passage 316 may correspond with the second line 232 described above.

The spool valve 304 may comprise a body having a first end and a second end, where the body further includes a plurality of valve lands between the first and second ends. As shown, the valve 304 may include a first land 308 located at a first end, a second land 310, and a third land 312. The third land 312 may be located at the second end of the valve spool 304, with the second land 310 located between the first and second lands.

A valve spool or return spring 306 may also be located in the valve body 302 such that the spring 306 exerts a spring force against the valve spool 304. To counteract the spring force, the valve system 300 may include an armature 318 having magnetic properties. The armature 318 may include a pin (not shown) or other structure which mechanically acts on the valve spool 304. In the embodiment of FIG. 3, the armature 318 is at least partially surrounded by a first electromagnetic coil 320 and a second electromagnetic coil 322. In this embodiment, the coils are arranged concentrically with respect to one another. As described above, however, the coils may be arranged in parallel or series with respect to one another.

Each of the electromagnetic coils is in electrical communication with a controller 202. The controller 202 may include control logic to determine when to energize or de-energize each coil. The controller 202 may communicate independently with each coil as well. For example, the controller 202 may be in communication with the first coil 320 via a first communication link 324 and with the second coil 322 via a second communication link 326. Thus, if a signal is communicated to the first coil 320 over the first communication link 324, it is not received by the second coil 322, and vice versa. In other words, the second coil 322 is not in communication with the first communication link 324, and the first coil 320 is not in communication with the second communication link 326. As a result, any erroneous signal over either communication link is not received by both coils and thereby does not cause erroneous engagement or disengagement of the brake actuator 208.

During operation, a current or electrical signal may be communicated by the controller 202 to each coil. Upon receiving the current or signal, the coil is energized and forms a magnetic field which can result in a force being exerted on the armature 318. As described above, the armature 318 may be mechanically coupled to the valve spool 304, which moves longitudinally or axially 328 within the valve body 302 to divert hydraulic fluid between different ports including the brake actuator port 314. While only one port 314 is shown in FIG. 3, it is understood that there may be a plurality of ports fluidly coupled to the valve spool 304. For example, one port may be fluidly coupled to the pressure source 204 of FIG. 2.

In FIG. 3, the redundancy of the valve system 300 is provided in a single direction. For instance, in some situations an incidental engagement (or disengagement) of a valve is more undesirable than the opposite. This may be dependent upon the architecture of the rest of the control system and how actuating a valve changes the desired state of the system. In the present embodiment, the valve spool spring 306 exerts a greater net force against the valve spool 304 than when only one of the electromagnetic coils is energized.

Each of the coils is independently energized by the controller 202 as described above. When the controller 202 sends current or an electrical signal via the first communication link 324 and the second communication link 326 to energize the first and second coils, respectively, the resulting net force is greater than the spring force of the valve spool spring 306. Thus, the armature 318 can actuate the valve spool 304 to compress the valve spool spring 306 and move from a first position to a second position. As the spring 306 is compressed, the flow channel 316 may be opened to allow fluid to flow into the hydraulic actuator port 314. As a result, hydraulic fluid may apply the brake actuator 208 and release the brake.

When both electromagnetic coils are energized and the valve spool spring 306 is compressed, the control redundancy of the system is not provided for in the opposite direction. In other words, with the spring 306 compressed, if either of the first coil 320 or second coil 322 is de-energized, the spring force exceeds the force from only one energized coil thereby causing the valve spool 304 to shift from its second position to its first position. As this happens, a fluid connection between the pressure source 204 and the brake actuator port 314 is blocked by one of the valve lands of the valve spool 304. Thus, the brake actuator 208 may be hydraulically released allowing for the engagement of the brake.

It is worth noting that the architecture of the overall braking control system may be designed to prevent unintentional engagement of the brake. The valve system 300 of FIG. 3 therefore protects against the unintentional disengagement of the brake.

While exemplary embodiments incorporating the principles of the present disclosure have been described herein, the present disclosure is not limited to such embodiments. Instead, this application is intended to cover any variations, uses, or adaptations of the disclosure using its general principles. Further, this application is intended to cover such departures from the present disclosure as come within known or customary practice in the art to which this disclosure pertains.

The invention claimed is:

1. An electrohydraulic valve system for controlling a braking system of a work machine, comprising:
    a valve body forming a bore and a fluid channel;
    a valve spool disposed within the bore and in fluid communication with the fluid channel, the valve spool including at least a first land and a second land;
    an armature positioned with respect to the valve spool to move the valve spool axially within the bore between a first position and a second position;
    a spring disposed within the bore and biasing the valve spool to its first position;
    a first electromagnetic coil being operably controlled between an energized state and a de-energized state, the first electromagnetic coil configured to receive a first electrical signal via a first communication link; and
    a second electromagnetic coil being operably controlled between an energized state and a de-energized state independently of the first electromagnetic coil, the second electromagnetic coil configured to receive a second electrical signal via a second communication link, wherein the first communication link and the second communication link are independent from one another;

wherein, the first and second electromagnetic coils are arranged relative to the armature for forming a magnetic field when energized;

wherein, the spring biases the valve spool to its first position when at least one of the first and second electromagnetic coil is in its de-energized state;

a controller operatively connected to the first communication link and to the second communication link to control actuation of each of the first electromagnetic coil and the second electromagnetic coil; and wherein the controller includes control logic to independently actuate each of the first electromagnetic coil and the second electromagnetic coil.

2. The system of claim 1, wherein the first and second electromagnetic coils are arranged concentrically with respect to one another.

3. The system of claim 1, wherein a first net force exerted on the valve spool by the spring is opposed by a second net force exerted on the valve spool when the first and second electromagnetic coils are energized.

4. The system of claim 3, wherein:
when the first and second electromagnetic coils are de-energized, the first net force is greater than the second net force to bias the valve spool to its first position; and
when the first and second electromagnetic coils are energized, the second net force is greater than the first net force to bias the valve spool in its second position.

5. The system of claim 3, wherein when the valve spool is in its first position and either the first or second electromagnetic coil is energized, the first net force is greater than the second net force.

6. The system of claim 3, wherein when the valve spool is in its second position and either the first or second electromagnetic coil is de-energized, the first net force is greater than the second net force.

7. The system of claim 1, wherein:
in the first position, the valve spool blocks fluid communication between the flow channel and a pressure source; and
in the second position, the valve spool allows fluid communication between the flow channel and a pressure source.

8. An electrohydraulic control system for controlling a braking system of a work machine, comprising:
a controller operatively connected to a first communication link and to a second communication link;
a source of hydraulic fluid;
a brake actuator configured for moving between an engaged and disengaged position;
a valve body forming a bore and a port, the port being fluidly coupled to the bore, to the source of hydraulic fluid, and to the brake actuator;
a valve spool disposed within the bore and in fluid communication with the port, the valve spool including at least a first land and a second land;
an armature positioned with respect to the valve spool to move the valve spool axially within the bore between a first position blocking a fluid connection between the source of hydraulic fluid and the port and a second position;
a spring, including a spring force, the spring disposed within the bore and biasing the valve spool to its first position; and a first electromagnetic coil and a second electromagnetic coil arranged relative to one another and the armature for forming a magnetic field when energized; and wherein, the first electromagnetic coil is in electrical communication with the controller to receive a first electrical signal via the first communication link, and the second electromagnetic coil is in electrical communication with the controller to receive a second electrical signal via the second communication link;

further wherein, the first communication link and the second communication link are independent from one another and independently actuate each of the first electromagnetic coil and the second electromagnetic coil, and wherein the first electrical signal and the second electrical signal are respectively communicated by the controller to the first electromagnetic coil and the second electromagnetic coil to independently energize both the first electromagnetic coil and the second electromagnetic coil to provide a resulting net force greater than the spring force, wherein the spring force biases the valve spool to its first position when at least one of the first electromagnetic and second electromagnetic coil is in its de-energized state.

9. The system of claim 8, wherein, the spring biases the valve spool to its first position in response to one of the first electromagnetic coil or the second electromagnetic coil, when at least one of the first and second electromagnetic coil is in its de-energized state.

10. The system of claim 8, wherein the first and second electromagnetic coils are arranged concentrically with respect to one another.

11. The system of claim 8, wherein a first net force exerted on the valve spool by the spring is opposed by a second net force exerted on the valve spool when the first and second electromagnetic coils are energized.

12. The system of claim 11, wherein:
when the first and second electromagnetic coils are de-energized, the first net force is greater than the second net force to bias the valve spool to its first position; and
when the first and second electromagnetic coils are energized, the second net force is greater than the first net force to bias the valve spool to its second position.

13. The system of claim 11, wherein when the valve spool is in its first position and either the first or second electromagnetic coil is energized, the first net force is greater than the second net force.

14. The system of claim 11, wherein when the valve spool is in its second position and either the first or second electromagnetic coil is de-energized, the first net force is greater than the second net force.

15. The system of claim 8, wherein:
in the second position, the valve spool allows fluid communication between the source of hydraulic fluid and the port.

16. A work machine, comprising:
a controller operatively connected to a first communication link and to a second communication link, the controller including control logic to independently de-energize or energize each of a first electromagnetic coil and a second electromagnetic coil of a valve system, wherein if there is an error in the control logic and if both of the first electromagnetic coil and the second electromagnetic coil are not energized or de-energized, the valve system does not change state;
a braking system comprising a brake actuator for engaging or disengaging a brake;
a source of hydraulic pressure; and an electrohydraulic valve system comprising:
- a valve body forming a bore and a port, the port being fluidly coupled to the bore and the brake actuator;
- a valve spool disposed within the bore and in fluid communication with the port, the valve spool including at least a first land and a second land;
- an armature positioned with respect to the valve spool to move the valve spool axially within the bore between a first position and a second position;
- a spring, including a spring force, the spring disposed within the bore and biasing the valve spool to its first position; and
- the first electromagnetic coil and the second electromagnetic coil arranged relative to one another and the armature for forming a magnetic field when energized;
- wherein, the first electromagnetic coil is in electrical communication with the controller via the first communication link, and the second electromagnetic coil is in electrical communication with the controller via the second communication link;
- wherein, the first communication link and the second communication link are independent from one another and independently control the first electromagnetic coil and the second electromagnetic coil;
- further wherein, the spring biases the valve spool to its first position when at least one of the first and second electromagnetic coil is in its de-energized state; and
- further wherein when the first and second electromagnetic coils are energized independently, the second net force is greater than the first net force to bias the valve spool to its second position, wherein the spring force biases the valve spool to its first position when at least one of the first electromagnetic coil and second electromagnetic coil is in its de-energized state.

17. The work machine of claim 16, wherein:
- in the first position, the valve spool blocks fluid communication between the source and the port; and
- in the second position, the valve spool allows fluid communication between the source and the port.

18. The work machine of claim 16, further comprising a first net force exerted on the valve spool by the spring force opposed by a second net force exerted on the valve spool by the first and second electromagnetic coils;
wherein:
- when the first and second electromagnetic coils are de-energized, the first net force is greater than the second net force to bias the valve spool to its first position;
- when the valve spool is in its first position and either the first or second electromagnetic coil is energized, the first net force is greater than the second net force; and
- when the valve spool is in its second position and either the first or second electromagnetic coil is de-energized, the first net force is greater than the second net force.

* * * * *